United States Patent
Anderson et al.

(10) Patent No.: US 10,738,620 B2
(45) Date of Patent: Aug. 11, 2020

(54) COOLING ARRANGEMENT FOR ENGINE COMPONENTS

(71) Applicant: United Technologies Corporation, Farmington, CT (US)

(72) Inventors: Corey D. Anderson, East Hartford, CT (US); Jeremy Styborski, East Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 115 days.

(21) Appl. No.: 15/956,298

(22) Filed: Apr. 18, 2018

(65) Prior Publication Data

US 2019/0323358 A1   Oct. 24, 2019

(51) Int. Cl.
   *F01D 9/04* (2006.01)
   *F01D 5/18* (2006.01)
   *F01D 11/08* (2006.01)

(52) U.S. Cl.
   CPC .......... *F01D 5/186* (2013.01); *F01D 9/041* (2013.01); *F01D 11/08* (2013.01); *F05D 2220/32* (2013.01); *F05D 2240/81* (2013.01); *F05D 2260/201* (2013.01); *F05D 2260/202* (2013.01)

(58) Field of Classification Search
   CPC .......... F01D 5/186; F01D 11/08; F01D 9/041; F05D 2260/202; F05D 2260/201; F05D 2240/81
   See application file for complete search history.

(56) References Cited

U.S. PATENT DOCUMENTS

| 5,098,257 A * | 3/1992 | Hultgren .................. F01D 5/18 415/115 |
| 6,382,906 B1 * | 5/2002 | Brassfield ................. F01D 5/18 415/115 |
| 8,152,468 B2 | 4/2012 | Propheter-Hinckley et al. |
| 8,182,199 B2 | 5/2012 | Farah et al. |
| 8,292,573 B2 | 10/2012 | Broomer et al. |
| 9,169,733 B2 | 10/2015 | Kerber et al. |
| 9,523,283 B2 * | 12/2016 | Uechi ..................... F01D 5/189 |
| 9,581,085 B2 | 2/2017 | Bartz et al. |
| 9,677,412 B2 | 6/2017 | Jones et al. |
| 9,683,449 B2 | 6/2017 | He et al. |
| 2011/0123351 A1 * | 5/2011 | Hada ....................... F01D 5/189 416/97 R |
| 2016/0069190 A1 * | 3/2016 | Spangler ................. F01D 9/065 60/806 |
| 2016/0312631 A1 | 10/2016 | Bergman |
| 2019/0170002 A1 * | 6/2019 | Spangler ................. F01D 5/147 |

OTHER PUBLICATIONS

EP search report for EP19169810.9 dated Aug. 23, 2019.

* cited by examiner

*Primary Examiner* — Igor Kershteyn
*Assistant Examiner* — Danielle M. Christensen
(74) *Attorney, Agent, or Firm* — Getz Balich LLC

(57) ABSTRACT

A gas turbine engine includes a first vane of a turbine section, a second vane of the turbine section, an impingement plate that includes a first impingement hole and a second impingement hole, and a pipe that supplies a fluid. The first vane includes a first platform. The second vane includes a second platform and a baffle. A first portion of the fluid traverses the first impingement hole and impinges on a first surface of the first platform. A second portion of the fluid traverses the second impingement hole and impinges on a second surface of the second platform. A third portion of the fluid bypasses the impingement plate and enters the baffle.

19 Claims, 6 Drawing Sheets

COOLING ARRANGEMENT FOR ENGINE COMPONENTS

BACKGROUND

Gas turbine engines, such as those which power aircraft and industrial equipment, may employ a compressor to compress air that is drawn into the engine and a turbine to capture energy associated with the combustion of a fuel-air mixture. In many engines, a combustor produces gases that are non-uniform in terms of a temperature and/or pressure profile along one or more reference directions. As a result of such non-uniformity, a first component (e.g., a first turbine vane) axially downstream of the combustor may experience different environmental conditions relative to a second component (e.g., a second turbine vane). For example, the first component may be subjected to elevated/increased temperatures relative to the second component (even if the first and second components are located at a common axial station plane/stage). The first component may be subject to elevated temperatures due to, e.g., being located in axial alignment with a fuel nozzle (the second component may be offset/skewed relative to any fuel nozzles).

Exposing a component to strenuous environmental conditions (e.g., elevated temperature or pressure) may have a tendency to reduce the component's effective lifetime. Continuing the above example, if the first component is routinely/regularly subjected to elevated temperatures, a first material of the first component may be subject to increased thermal fatigue relative to a second material of the second component (even if the first and second materials are the same material). In some instances, the first component may need to be retired from service/replaced at an earlier point in time than the second component in order to ensure stable/reliable engine operation.

One technique for mitigating the impact of elevated temperature on a component is to cool the component via application of a cooling fluid. However, the cooling fluid is a resource and its use impacts the performance/efficiency of the engine.

Components that are subject to, e.g., strenuous environmental conditions may be identified. Continuing the above example, simulation and/or testing may be performed to identify the first and second components for a particular engine platform/design. What is needed is an ability to enhance the operational lifetime of the components/engine on the basis of that identification. Furthermore, what is needed is an ability to obtain such an enhancement without simply increasing an amount/volume of cooling fluid that is used.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine comprising: a first vane of a turbine section, a second vane of the turbine section, an impingement plate that includes a first impingement hole and a second impingement hole, and a pipe that supplies a fluid, where the first vane includes a first platform, where the second vane includes a second platform and a baffle, where a first portion of the fluid traverses the first impingement hole and impinges on a first surface of the first platform, where a second portion of the fluid traverses the second impingement hole and impinges on a second surface of the second platform, and where a third portion of the fluid bypasses the impingement plate and enters the baffle. In some embodiments, the first vane includes an airfoil, and the airfoil defines an airfoil cooling cavity entrance that receives the first portion of the fluid subsequent to the first portion of the fluid impinging on the first surface of the first platform. In some embodiments, the first platform includes a third surface that is opposed to the first surface, and the first platform includes a film hole defined between the first surface and the third surface, and the film hole conveys at least a portion of the first portion of the fluid to generate a film on the third surface. In some embodiments, the second vane includes an airfoil, and the airfoil defines an airfoil cooling cavity entrance that receives the third portion of the fluid subsequent to the third portion of the fluid entering the baffle. In some embodiments, the airfoil cooling cavity entrance does not receive the second portion of the fluid. In some embodiments, the first vane includes a second airfoil, and the second airfoil defines a second airfoil cooling cavity entrance that receives the second portion of the fluid subsequent to the second portion of the fluid impinging on the second surface of the second platform. In some embodiments, the gas turbine engine further comprises a case, a first platform rail that is coupled to the case, the first platform, the second platform, and the impingement plate, a first impingement plate rail that is coupled to the first platform, the second platform, and the impingement plate, a second impingement plate rail that is coupled to the first platform, the second platform, and the impingement plate, and a second platform rail that is coupled to the case, the first platform, the second platform, and the impingement plate. In some embodiments, the gas turbine engine extends along an axial centerline, and the first platform rail is located forward of the first impingement plate rail with respect to the axial centerline, and the second impingement plate rail is located forward of the second platform rail with respect to the axial centerline, and the first platform rail abuts the first impingement plate rail, and the second impingement plate rail abuts the second platform rail. In some embodiments, the impingement plate is located radially outward of the first impingement plate rail and the second impingement plate rail with respect to the axial centerline. In some embodiments, the impingement plate and the baffle are composed of steel. In some embodiments, the gas turbine engine further comprises a compressor section, where the pipe is coupled to the compressor section. In some embodiments, the first vane and the second vane are included as part of a first stage of the turbine section. In some embodiments, the gas turbine engine extends along an axial centerline, and the gas turbine engine further comprises a first rotor disk, a first plurality of blades, and a first seal that are included as part of a second stage of the turbine section, and a second rotor disk, a second plurality of blades, and a second seal that are included as part of a third stage of the turbine section, where the second stage is located forward of the first stage with respect to the axial centerline, and where the third stage is located aft of the second stage with respect to the axial centerline. In some embodiments, the first vane includes an airfoil located radially inward of the first platform with respect to the axial centerline, and the first vane includes a third platform located radially inward of the airfoil with respect to the axial centerline, and the gas turbine engine further comprises a first cover plate coupled to the first rotor disk, a second cover plate coupled to the second rotor disk, a third seal coupled to the third platform, the third seal including a first sealing land that defines a first sealing interface with respect to the first cover plate and a second sealing land that defines a second sealing interface with respect to the second cover plate, where the first rotor disk, the second rotor disk, the first cover plate, the second cover plate, and the third seal at least partially define a rotor cavity, where the third platform and the third seal at least partially define an inner cavity, where the inner cavity receives at least a portion of the first portion of the fluid via the airfoil as a fourth portion of the fluid, where the third seal defines an orifice that conveys the fourth portion of the fluid to the rotor cavity. In some embodiments, the gas turbine engine extends along an axial centerline, and the gas turbine engine further comprises a combustor section located forward of the turbine section with respect to the axial centerline, where the first vane is subject to a first temperature associated with an output of the combustor section when the gas turbine engine is operated, where the second vane is subject to a second temperature associated with the output of the combustor section when the gas turbine engine is operated, where the second temperature is greater than the first temperature.

Aspects of the disclosure are directed to a system comprising: a first vane section that includes at least a first vane, a second vane section that includes at least a second vane, a first impingement plate rail, a second impingement plate rail, an impingement plate coupled to the first vane section and the second vane section via the first impingement plate rail and the second impingement plate rail, where the first vane includes a first airfoil and is baffle-free, where the second vane includes a second airfoil and a baffle, where the impingement plate includes a plurality of impingement holes, where the first airfoil receives a first portion of a fluid via the impingement holes, where the second airfoil receives a second portion of the fluid via the baffle, and where the second portion of the fluid bypasses the impingement plate in entering the second airfoil. In some embodiments, the first vane section and the second vane section abut one another. In some embodiments, the first vane section and the second vane section abut one another within a common vane stage of an engine. In some embodiments, the first vane includes a first platform and the second vane includes a second platform, and the first portion of the fluid impinges upon the first platform, and a third portion of the fluid impinges upon the second platform, and the first airfoil receives the third portion of the fluid.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

Figure 1:
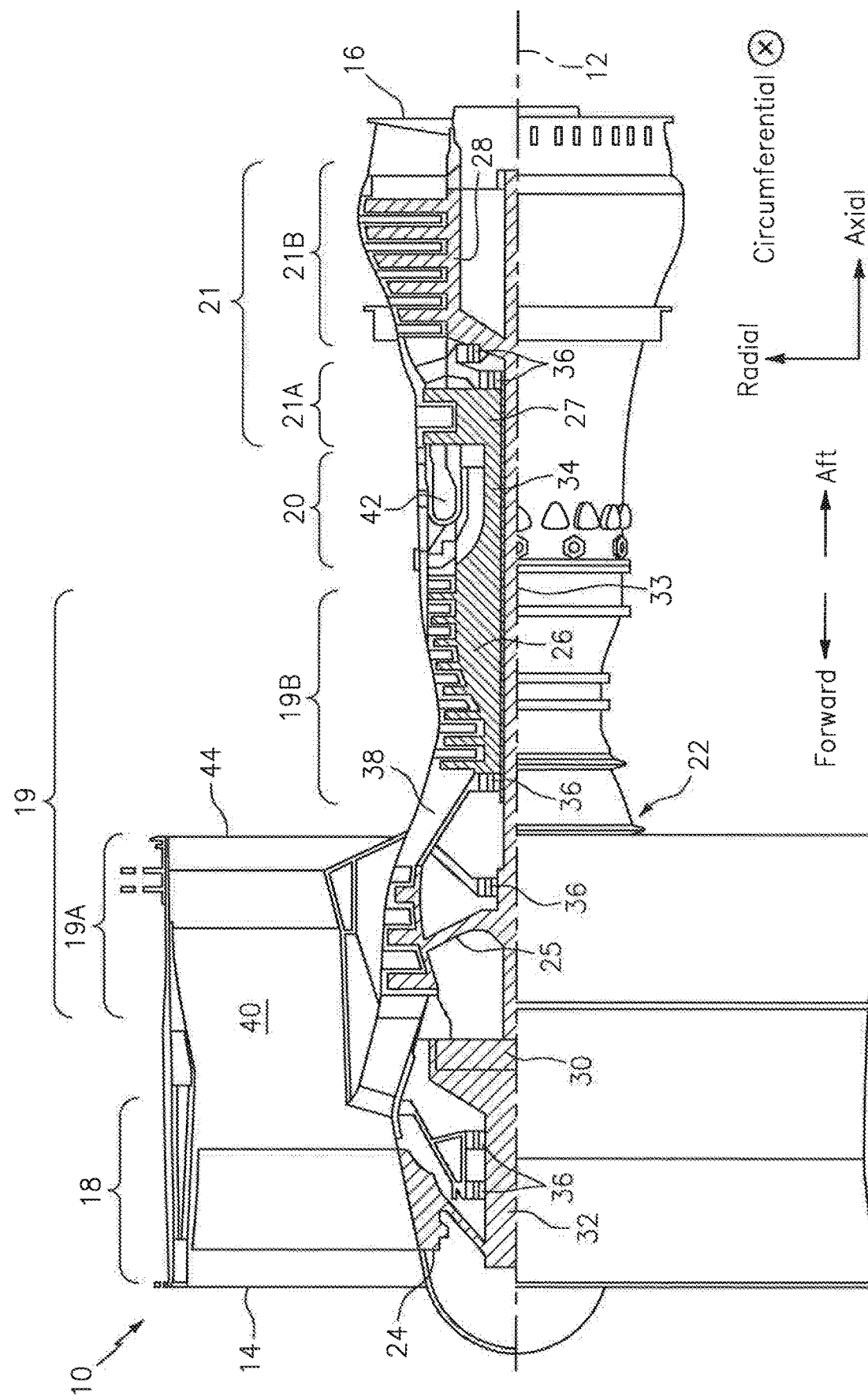
FIG. 1 is a side cutaway illustration of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities and/or a gap/space between entities.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path/duct 38 and a bypass gas path/duct 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
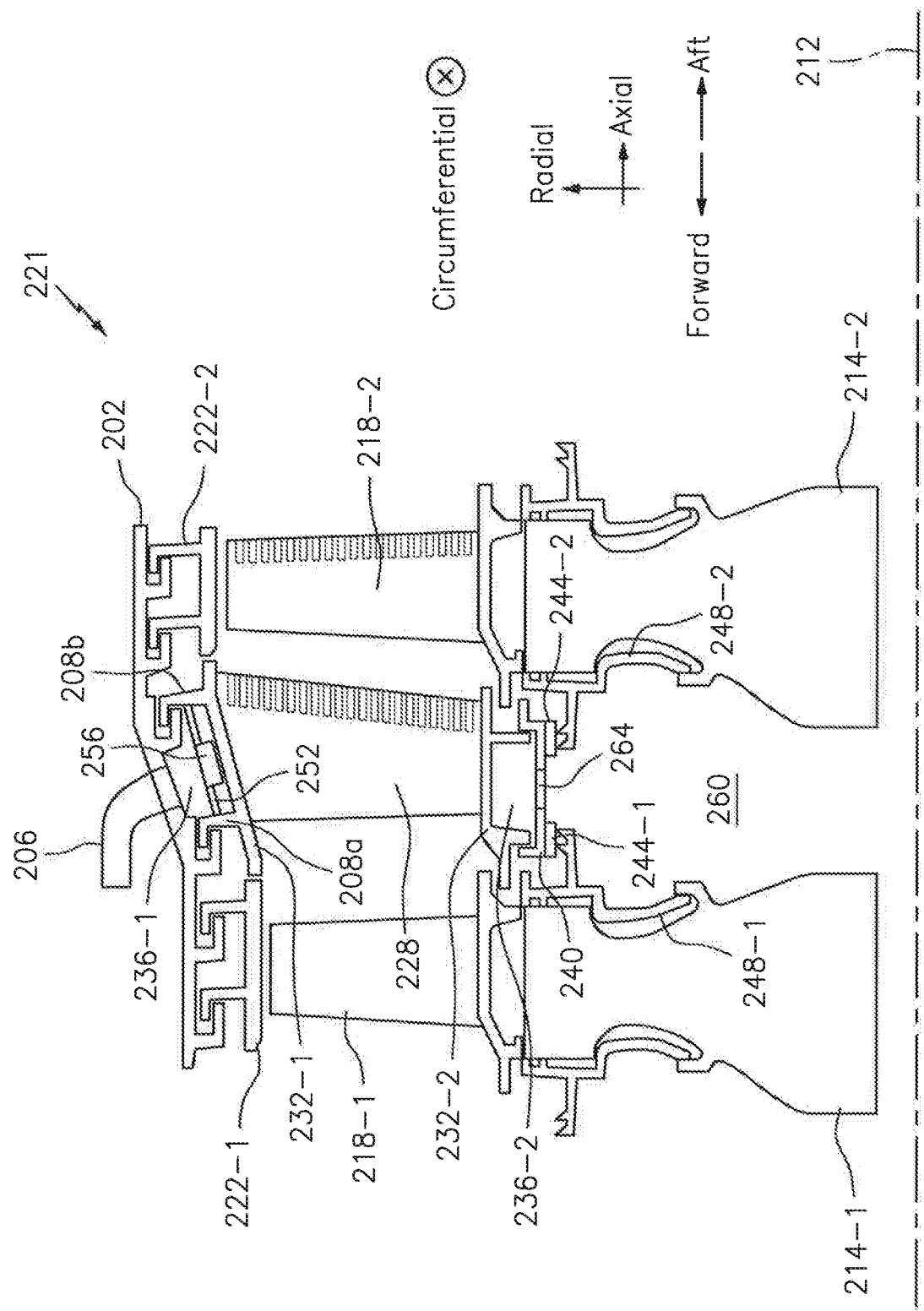
FIG. 2 illustrates a portion of a turbine section of an engine.

Referring to FIG. 2, a portion of a turbine section 221 of an engine is shown. The portion of the turbine section 221 may correspond to a portion of the turbine section 21 of FIG. 1. Also shown in FIG. 2 is an engine longitudinal centerline 212 (which may correspond to the centerline 12 of FIG. 1).

The turbine section 221 may include a case 202 and a conduit/pipe 206. The case 202 may be arranged as a full-hoop structure. The pipe 206 may supply a cooling fluid to a vane cavity as is described further below. The cooling fluid may be obtained from one or more sources; for example, the cooling fluid may be obtained from a compressor section of an engine (see, e.g., compressor section 19 of FIG. 1), from an output of a heat exchanger, etc.

While a single pipe 206 is shown, in some embodiments more than one pipe 206 may be included. For example, in some embodiments between two and four pipes 206 may be located around the circumference of the turbine section 221.

The turbine section 221 may include alternating stages of rotational structure and static structure. For example, the turbine section 221 may include a first rotor disk 214-1 and a second rotor disk 214-2, where the second rotor disk 214-2 is disposed axially aft of the first rotor disk 214-1. The rotor disks 214-1 and 214-2 may be coupled to respective airfoils/blades 218-1 and 218-2. The airfoils 218-1 and 218-2 may interface to respective seals 222-1 and 222-2. As shown in FIG. 2, the seals 222-1 and 222-2 may be coupled to the case 202. Each of the seals 222-1 and 222-2 is frequently referred to as a blade outer air seal (BOAS) in the relevant art.

Axially disposed between, e.g., the first rotor disk 214-1 and the second rotor disk 214-2 may be a stage of static (e.g., non-rotating) structure, frequently referred to as a vane in the relevant art. The vane may include an airfoil 228 that is bounded by a (radially) outer platform 232-1 and a (radially) inner platform 232-2. A forward platform rail 208a and an aft platform rail 208b may couple the outer platform 232-1 to the case 202.

The case 202 and the outer platform 232-1 may at least partially define an outer vane cavity 236-1. The inner platform 232-2 and a seal 240 may at least partially define an inner vane cavity 236-2. The seal 240 may be arranged as a full-hoop structure.

The seal 240 may include, or be coupled to, one or more seal lands. For example, FIG. 2 illustrates a first seal land 244-1 and a second seal land 244-2. The seal lands 244-1 and 244-2 may interface to respective cover plates 248-1 and 248-2. The cover plates 248-1 and 248-2 may be coupled to the first rotor disk 214-1 and the second rotor disk 214-2, respectively. The cover plates 248-1 and 248-2 may be arranged as full-hoop structures.

Located radially outward/outboard of the outer platform 232-1 there may be present an impingement plate 252 and a baffle 256. As used herein, a "baffle" refers to an entrance to a structure (e.g., a vane). The impingement plate 252 and the baffle 256 may be composed of/include one or more materials. For example, the impingement plate 252 and/or the baffle 256 may include steel. While described above as separate components/structures, the impingement plate 252 and the baffle 256 may be manufactured as a unitary component in some embodiments.

When the engine is operated, cooling fluid supplied via the pipe 206 may enter the outer vane cavity 236-1. From the outer vane cavity 236-1, the cooling fluid may traverse at least one of the impingement plate 252 or the baffle 256. For example, and as discussed further below, at least a first portion of the cooling fluid in the outer vane cavity 236-1 may traverse the impingement plate 252 to cool the outer platform 232-1. A second portion of the cooling fluid in the outer vane cavity 236-1 may directly enter the airfoil 228 via the baffle 256, bypassing the impingement plate 252.

Once the cooling fluid traverses the airfoil 228 in, e.g., a radially inward/inboard direction, at least a portion of the cooling fluid may be admitted into the inner vane cavity 236-2. From the inner vane cavity 236-2, the cooling fluid may be provided to a rotor cavity 260 via an orifice 264 defined by the seal 240. The rotor cavity 260 may be at least partially defined/bounded by the disks 214-1 and 214-2, the cover plates 248-1 and 248-2, and the seal 240. A portion of the fluid in the rotor cavity 260 may bypass the interfaces between the cover plates 248-1 and 248-2 and their respective seal lands 244-1 and 244-2 and may cool, e.g., the airfoils 218-1 and 218-2.

While the pipe 206 is shown as being fluidly coupled to the outer vane cavity 236-1, in some embodiments the pipe 206 may be coupled to the inner vane cavity 236-2. Stated differently, the cooling fluid may initially be supplied to the inner vane cavity 236-2 to cool, e.g., the inner platform 232-2; from the inner vane cavity 236-2, at least a portion of the cooling fluid may traverse the airfoil 228 and flow to, e.g., the outer vane cavity 236-1. In some embodiments, an impingement plate and a baffle may be located in/proximate to the inner vane cavity 236-2.

Figure 3A:
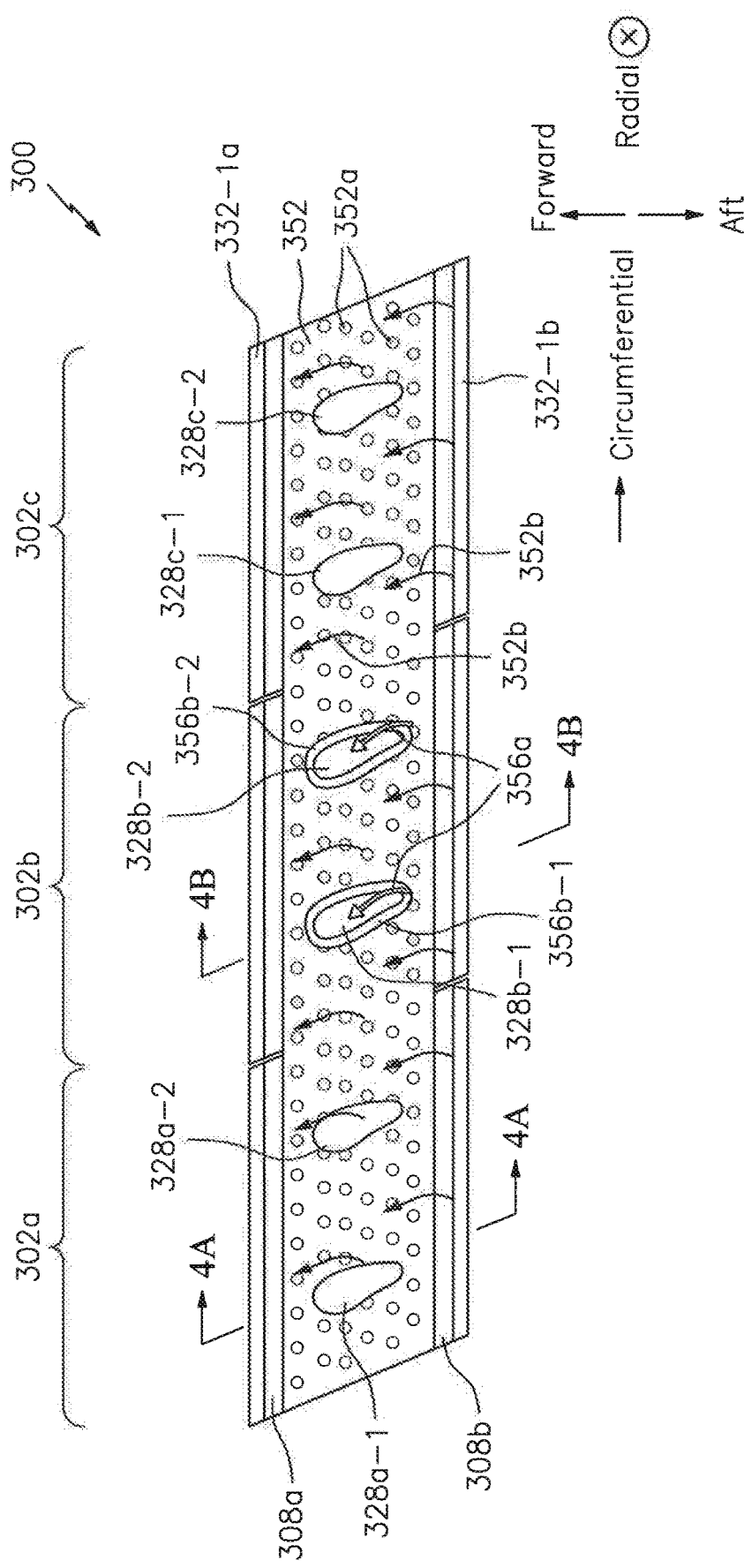
FIG. 3A illustrates a portion of a stage of vanes in relation to an impingement plate.

Referring to FIG. 3A, a portion of a stage 300 of vanes is shown. The stage 300 may include a number of sections/segments (e.g., sections 302a, 302b, and 302c). The sections may be arranged circumferentially adjacent to one another, such that when the sections are assembled the sections form a 360 degree ring around the circumference of an engine.

Each of the sections 302a-302c may include one or more vanes. For example, the section 302a may include a first vane 328a-1 and a second vane 328a-2, the section 302b may include a third vane 328b-1 and a fourth vane 328b-2, and the section 302c may include a fifth vane 328c-1 and a sixth vane 328c-2. While in FIG. 3A two vanes per section are shown, any number of vanes may be included in a given section.

The stage 300 (e.g., one or more of the sections 302a-302c) may include a forward/leading platform edge 332-1a and an aft/trailing platform edge 332-1b (where the edges 332-1a and 332-1b may correspond to edges of the platform 232-1 of FIG. 2). When the stage 300 is assembled as part of an engine, the platform edges 332-1a and 332-1b may be located proximate/adjacent to one or more structures. For example, and referring to FIGS. 2 and 3A, the platform edge 332-1a may be located adjacent to the seal 222-1 and the platform edge 332-1b may be located adjacent to the seal 222-2.

The stage 300 (e.g., one or more of the sections 302a-302c) may include a forward platform rail 308a and an aft platform rail 308b. The platform rails 308a and 308b may correspond to the respective platform rails 208a and 208b of FIG. 2.

Axially disposed between the forward platform rail 308a and the aft platform rail 308b may be an impingement plate 352 (which may correspond to the impingement plate 252 of FIG. 2). The impingement plate 352 may define/include one or more impingement holes/passages, such as for example impingement holes 352a. The impingement holes 352a may admit/enable a passage of an impingement fluid flow 352b from a cavity (e.g., outer vane cavity 236-1 of FIG. 2) to a platform (e.g., platform 232-1 of FIG. 2) to cool the platform.

At least some of the vanes included in the stage 300 may include a baffle. For example, the vane 328b-1 may include a baffle 356b-1 and the vane 328b-2 may include a baffle 356b-2 (where the baffle 356b-1 and/or the baffle 356b-2 may correspond to a baffle 256 as shown in FIG. 2). As described further below, the baffles 356b-1 and 356b-2 may provide a baffle fluid flow 356a from a cavity (e.g., outer vane cavity 236-1 of FIG. 2) directly to an airfoil (e.g., airfoil 228 of FIG. 2) of the respective vane 328b-1 and 328b-2. The baffle fluid flow 356a may not traverse the impingement plate 352/impingement holes 352a. Stated slightly differently, the baffle fluid flow 356a may bypass the impingement plate 352/impingement holes 352a.

At least some of the vanes (e.g., vanes 328a-1, 328a-2, 328c-1, and 328c-2) included in the stage 300 may not include a baffle. In this respect, some of the vanes may be baffle-free.

One or more techniques (e.g., simulation, testing, etc.) may be used to identify which of the vanes (e.g., vanes 328b-1 and 328b-2) is allocated a baffle (e.g., baffles 356b-1 and 356b-2). For example, a vane that is subjected/exposed to one or more elevated operating parameter (e.g., temperature, pressure, etc.) values relative to one or more thresholds may include a baffle. Conversely, a vane that is subjected/exposed to operating parameter value(s) less than the one or more thresholds may be baffle-free.

Figure 3B:
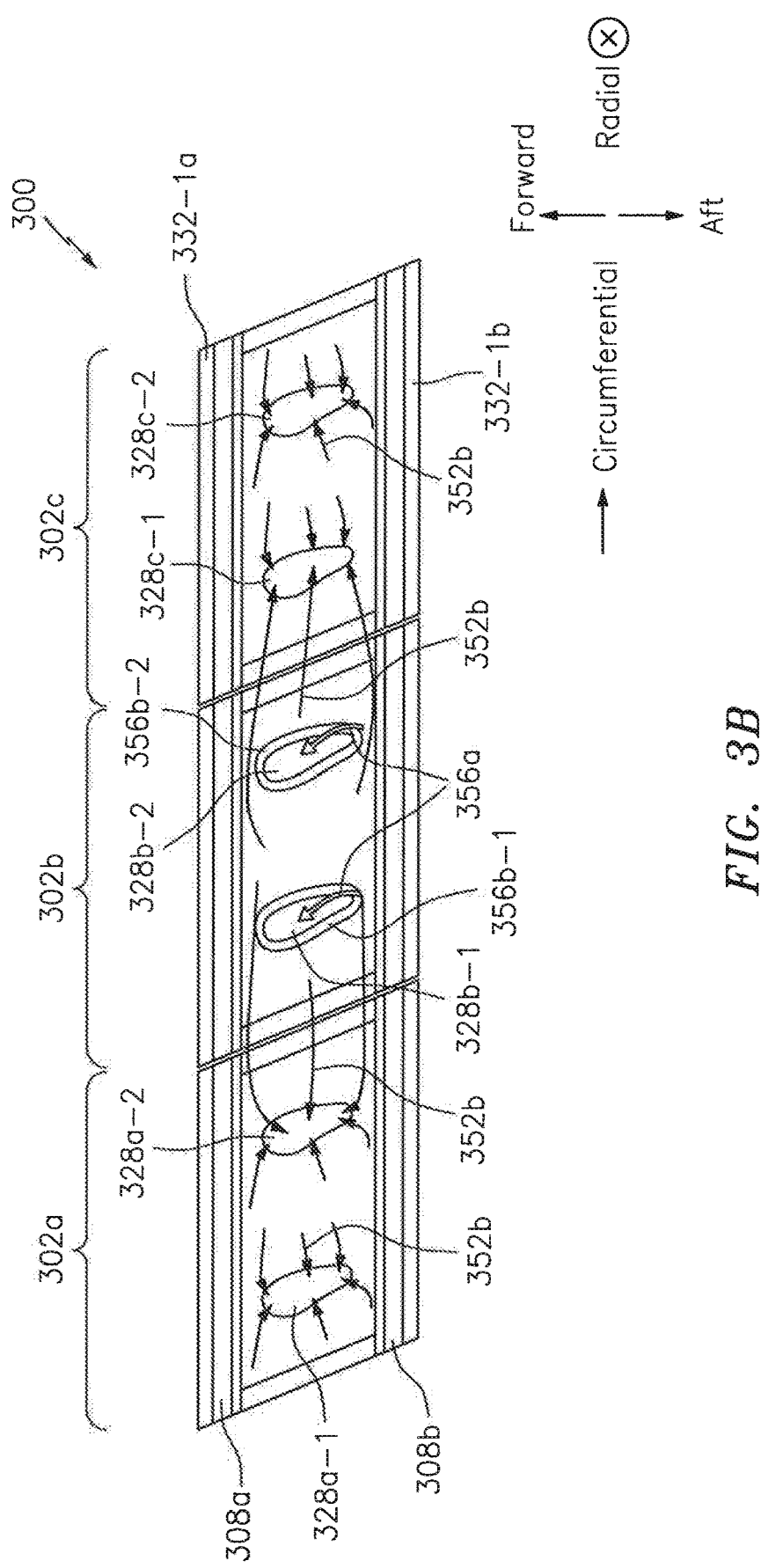
FIG. 3B corresponds to FIG. 3A with the impingement plate having been removed from view.

FIG. 3B illustrates the stage 300 of FIG. 3A with the impingement plate 352 of FIG. 3A having been removed from the view shown in FIG. 3B. Referring to FIGS. 2 and 3A-3B, impingement fluid flow 352b that traverses/passes-through the impingement plate 352/impingement holes 352a in going from, e.g., the cavity 236-1 to the platform 232-1 may not enter vanes (e.g., vanes 328b-1 and 328b-2) that include a baffle (e.g., baffle 356b-1 and 356b-2). Instead, and as shown in FIG. 3B, the impingement fluid flow 352b may only enter those vanes (e.g., vanes 328a-1, 328a-2, 328c-1, and 328c-2) that are baffle-free.

Figure 4A:
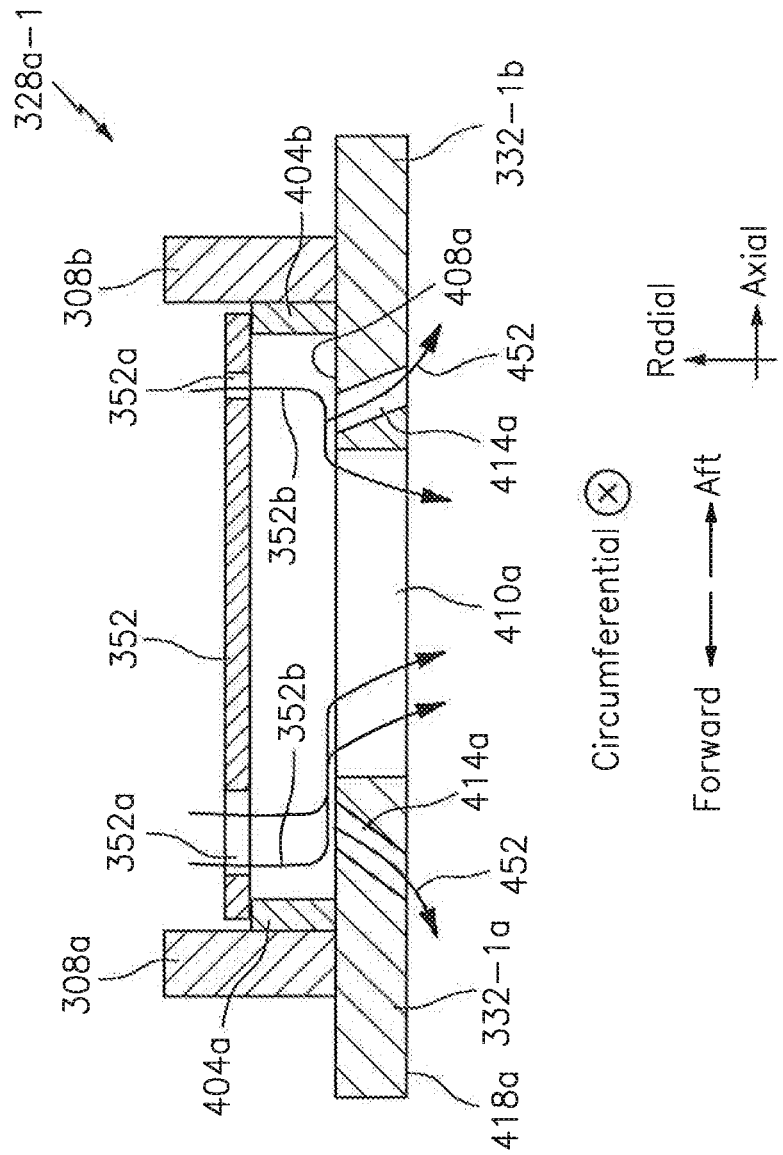
FIG. 4A illustrates a cross-sectional view of a portion of a first vane of FIGS. 3A-3B.

Referring to FIG. 4A, a cross-sectional view of the vane 328a-1 taken along the line 4A-4A of FIG. 3A is shown. As shown in FIG. 4A, a forward impingement plate rail 404a may be positioned adjacent to, and aft of, the forward platform rail 308a. An aft impingement plate rail 404b may be positioned adjacent to, and forward of, the aft platform rail 308b. The impingement plate rails 404a and 404b may provide support for the impingement plate 352.

As shown in FIG. 4A, at least a portion of the impingement fluid flow 352b may: (1) traverse the impingement holes 352a, (2) impinge upon a first surface 408a of a platform (e.g., platform 232-1 of FIG. 2) to cool the first surface 408a, and (3) enter an airfoil (e.g., airfoil 228 of FIG. 2) via an airfoil cooling cavity entrance 410a. In some embodiments, a portion of the impingement fluid flow 352b may enter one or more film holes (e.g., film holes 414a) as a film fluid flow 452. The film holes may be formed in, e.g., the forward platform edge 332-1a and/or the aft platform edge 332-1b and may traverse the platform from the first surface 408a to an opposed second surface 418a. The film holes may enable the formation of a thin film of fluid along the second surface 418a to provide cooling/protection to the second surface 418a.

Figure 4B:
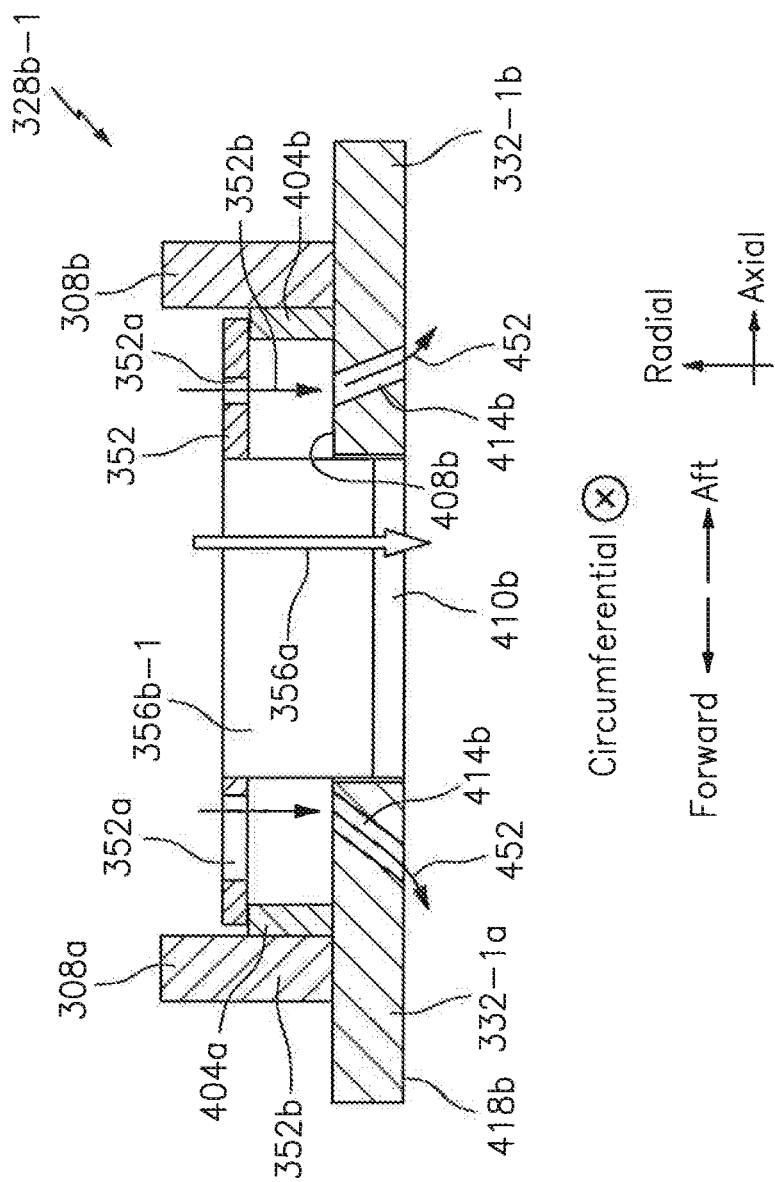
FIG. 4B illustrates a cross-section view of a portion of a second vane of FIGS. 3A-3B.

Referring to FIG. 4B, a cross-sectional view of the vane 328b-1 taken along the line 4B-4B of FIG. 3A is shown. The vane 328b-1 is shown in FIG. 4B as including many of the same components and features as described above in connection with, e.g., FIG. 4A. Accordingly, a complete re-description of those components and features is omitted for the sake of brevity. The platform surface 408b of FIG. 4B may be analogous to the platform surface 408a of FIG. 4A, the film holes 414b of FIG. 4B may be analogous to the film holes 414a of FIG. 4A, and the platform surface 418b of FIG. 4B may be analogous to the platform surface 418a of FIG. 4A.

In contrast to (the airfoil cooling cavity entrance 410a shown in) FIG. 4A, as shown in FIG. 4B an airfoil cooling cavity entrance 410b may not admit/receive a portion of the impingement fluid flow 352b. Instead, fluid that enters the airfoil cooling cavity entrance 410b via the baffle 356b-1 may correspond to the baffle fluid flow 356a.

In accordance with the embodiments described above, the impingement fluid flow 352b may incur a pressure drop in traversing the impingement plate 352/impingement holes 352a. Also, the impingement fluid of the impingement fluid flow 352b may incur an increase in temperature upon impinging against, e.g., the surface 408a (see FIG. 4A) or the surface 408b (see FIG. 4B) due to a removal of heat from the surface by the impingement fluid. Conversely, a baffle fluid of the baffle fluid flow 356a may not incur such a reduction in pressure (due to bypassing the impingement plate 352) or increase in temperature (due to a lack of contact with the surface 408a/408b), such that the baffle fluid may be more effective in terms of cooling relative to impingement fluid. Accordingly, components (e.g., vanes 328b-1 and 328b-2: see FIGS. 3A-3B and 4B) that are subject/exposed to elevated operating parameter (e.g., temperature, pressure, etc.) values (e.g., values that exceed one or more thresholds) may be provided with a baffle/baffle fluid flow, whereas components (e.g., vanes 328a-1, 328a-2, 328c-1, and 328c-2: see FIGS. 3A-3B and 4A) that are not subject/exposed to elevated operating parameter values may not be provided with a baffle/baffle fluid flow.

Various components of this disclosure (e.g., a baffle, an impingement plate, a rail, etc.) may be coupled (e.g., attached) to one another using one or more techniques as would be appreciated by one skilled in the art. Such techniques may include one or more of welding, brazing, application of an adhesive, bonding, use of an interference fit, use of rivets/bolts, use of tabs/slots, additive manufacturing, etc.

While some of the examples provided herein relate to a cooling of a vane/vane platform, aspects of the disclosure may be used to cool other types of components. For example, aspects of the disclosure may be applied to cool seals (e.g., seals 222-1 and 222-2 of FIG. 2).

Aspects of the disclosure may enhance (e.g., maximize) efficiency in terms of a use of a cooling fluid. A first component that is subjected to rigorous/elevated environmental conditions/parameter value(s) may receive a high pressure/low temperature fluid relative to a second component that is not subjected to such elevated value(s). On such a basis, the first and second components may wear at substantially similar rates. In this respect, and to the extent that the first and second components are included in an engine, engine service/maintenance related downtime may be reduced (e.g., minimized) as the first and second components may be repaired or replaced at the same time without sacrificing a potential remaining operative lifetime associated with the second component.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A gas turbine engine comprising:
 a first vane of a turbine section;
 a second vane of the turbine section;
 an impingement plate that includes a first impingement hole and a second impingement hole, the impingement plate coupled to the first vane and the second vane via a first impingement plate rail and a second impingement plate rail; and
 a pipe that supplies a fluid,
 wherein the first vane includes a first platform and a first airfoil and is baffle-free,
 wherein the second vane includes a second platform, a second airfoil, and a baffle,
 wherein a first portion of the fluid traverses the first impingement hole and impinges on a first surface of the first platform,
 wherein a second portion of the fluid traverses the second impingement hole and impinges on a second surface of the second platform, and
 wherein a third portion of the fluid bypasses the impingement plate and enters the baffle.

2. The gas turbine engine of claim 1, wherein the first airfoil defines first airfoil cooling cavity entrance that receives the first portion of the fluid subsequent to the first portion of the fluid impinging on the first surface of the first platform.

3. The gas turbine engine of claim 1, wherein the first platform includes a third surface that is opposed to the first surface, and wherein the first platform includes a film hole defined between the first surface and the third surface, and wherein the film hole conveys at least a portion of the first portion of the fluid to generate a film on the third surface.

4. The gas turbine engine of claim 1, wherein the second airfoil defines second airfoil cooling cavity entrance that receives the third portion of the fluid subsequent to the third portion of the fluid entering the baffle.

5. The gas turbine engine of claim 4, wherein the second airfoil cooling cavity entrance does not receive the second portion of the fluid.

6. The gas turbine engine of claim 4, wherein the first airfoil defines a first airfoil cooling cavity entrance that receives the second portion of the fluid subsequent to the second portion of the fluid impinging on the second surface of the second platform.

7. The gas turbine engine of claim 1, further comprising:
 a case;
 a first platform rail that is coupled to the case, the first platform, the second platform, and the impingement plate;
 wherein the first impingement plate rail is coupled to the first platform, the second platform, and the impingement plate;
 wherein the second impingement plate rail is coupled to the first platform, the second platform, and the impingement plate; and
 a second platform rail that is coupled to the case, the first platform, the second platform, and the impingement plate.

8. The gas turbine engine of claim 7, wherein the gas turbine engine extends along an axial centerline, and wherein the first platform rail is located forward of the first impingement plate rail with respect to the axial centerline, and wherein the second impingement plate rail is located forward of the second platform rail with respect to the axial centerline, and wherein the first platform rail abuts the first impingement plate rail, and wherein the second impingement plate rail abuts the second platform rail.

9. The gas turbine engine of claim 8, wherein the impingement plate is located radially outward of the first impingement plate rail and the second impingement plate rail with respect to the axial centerline.

10. The gas turbine engine of claim 1, wherein the impingement plate and the baffle are composed of steel.

11. The gas turbine engine of claim 1, further comprising:
 a compressor section,
 wherein the pipe is coupled to the compressor section.

12. The gas turbine engine of claim 1, wherein the first vane and the second vane are included as part of a first stage of the turbine section.

13. The gas turbine engine of claim 12, wherein the gas turbine engine extends along an axial centerline, the gas turbine engine further comprising:
 a first rotor disk, a first plurality of blades, and a first seal that are included as part of a second stage of the turbine section; and
 a second rotor disk, a second plurality of blades, and a second seal that are included as part of a third stage of the turbine section,
 wherein the second stage is located forward of the first stage with respect to the axial centerline, and
 wherein the third stage is located aft of the second stage with respect to the axial centerline.

14. The gas turbine engine of claim 13, wherein the first airfoil is located radially inward of the first platform with respect to the axial centerline, and wherein the first vane includes a third platform located radially inward of the first airfoil with respect to the axial centerline, the gas turbine engine further comprising:
 a first cover plate coupled to the first rotor disk,
 a second cover plate coupled to the second rotor disk,
 a third seal coupled to the third platform, the third seal including a first sealing land that defines a first sealing interface with respect to the first cover plate and a second sealing land that defines a second sealing interface with respect to the second cover plate,
 wherein the first rotor disk, the second rotor disk, the first cover plate, the second cover plate, and the third seal at least partially define a rotor cavity,
 wherein the third platform and the third seal at least partially define an inner cavity,
 wherein the inner cavity receives at least a portion of the first portion of the fluid via the airfoil as a fourth portion of the fluid,
 wherein the third seal defines an orifice that conveys the fourth portion of the fluid to the rotor cavity.

15. The gas turbine engine of claim 1, wherein the gas turbine engine extends along an axial centerline, the gas turbine engine further comprising:
a combustor section located forward of the turbine section with respect to the axial centerline,
wherein the first vane is subject to a first temperature associated with an output of the combustor section when the gas turbine engine is operated,
wherein the second vane is subject to a second temperature associated with the output of the combustor section when the gas turbine engine is operated,
wherein the second temperature is greater than the first temperature.

16. A system comprising:
a first vane section that includes at least a first vane;
a second vane section that includes at least a second vane;
a first impingement plate rail;
a second impingement plate rail;
an impingement plate coupled to the first vane section and the second vane section via the first impingement plate rail and the second impingement plate rail,
wherein the first vane includes a first airfoil and is baffle-free,
wherein the second vane includes a second airfoil and a baffle,
wherein the impingement plate includes a plurality of impingement holes,
wherein the first airfoil receives a first portion of a fluid via the impingement holes,
wherein the second airfoil receives a second portion of the fluid via the baffle, and
wherein the second portion of the fluid bypasses the impingement plate in entering the second airfoil.

17. The system of claim 16, wherein the first vane section and the second vane section abut one another.

18. The system of claim 17, wherein the first vane section and the second vane section abut one another within a common vane stage of an engine.

19. The system of claim 16, wherein the first vane includes a first platform and the second vane includes a second platform, and wherein the first portion of the fluid impinges upon the first platform, and wherein a third portion of the fluid impinges upon the second platform, and wherein the first airfoil receives the third portion of the fluid.

* * * * *